United States Patent
Cox et al.

(10) Patent No.: US 11,698,669 B2
(45) Date of Patent: Jul. 11, 2023

(54) SCALABLE, HIERARCHICAL POWER DELIVERY SYSTEM

(71) Applicant: Apple Inc., Cupertino, CA (US)

(72) Inventors: Keith Cox, Sunnyvale, CA (US); Jamie L. Langlinais, Los Gatos, CA (US); Inder M. Sodhi, Palo Alto, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 17/412,230

(22) Filed: Aug. 25, 2021

(65) Prior Publication Data

US 2023/0060391 A1  Mar. 2, 2023

(51) Int. Cl.
G06F 1/26 (2006.01)
H02M 3/155 (2006.01)
H02M 1/00 (2006.01)

(52) U.S. Cl.
CPC .............. *G06F 1/26* (2013.01); *H02M 3/155* (2013.01); *G06F 1/263* (2013.01); *H02M 1/007* (2021.05); *H02M 1/0067* (2021.05)

(58) Field of Classification Search
CPC .......... G06F 1/26; G06F 1/263; H02M 1/007; H02M 1/0067; H02M 3/155
USPC ........................................................ 713/300
See application file for complete search history.

(56) References Cited

U.S. PATENT DOCUMENTS

| | | | |
|---|---|---|---|
| 8,164,391 B2 | 4/2012 | Huynh | |
| 9,831,672 B2 | 11/2017 | Luh et al. | |
| 10,666,062 B2 | 5/2020 | Greening et al. | |
| 10,951,113 B1 | 5/2021 | Vinciarelli | |
| 11,228,246 B1* | 1/2022 | Vinciarelli | H02M 3/1584 |
| 2008/0111534 A1* | 5/2008 | Ravichandran | G06F 1/32 323/349 |
| 2008/0246341 A1 | 10/2008 | Pelley et al. | |
| 2009/0153108 A1* | 6/2009 | Hendin | H02M 3/28 323/234 |

(Continued)

FOREIGN PATENT DOCUMENTS

KR  10-2013-0054212 A   5/2013

OTHER PUBLICATIONS

International Search Report and Written Opinion in PCT Appl. No PCT/US2022/041350 dated Dec. 2, 2022, 10 pages.

*Primary Examiner* — Ji H Bae
(74) *Attorney, Agent, or Firm* — Kowert, Hood, Munyon, Rankin & Goetzel, P.C.; Erik A. Heter; Dean M. Munyon

(57) ABSTRACT

A hierarchical, scalable power delivery system is disclosed. The power delivery system includes a first level of power converter circuitry configured to generate one or more first level regulated supply voltages, and a second level of power converter circuitry configured to generate one or more second level regulated supply voltages. The first level of power converter circuitry receives an input supply voltage, while the second level power converter circuitry receives the one or more first level supply voltages. The second level power converter circuitry is configured to provide the second level regulated supply voltages to a computing element configured to operate as a single, logical computer system, the computing element being configured to operate in a number of power configurations having differing numbers of load circuits. Different portions of the hierarchical power delivery system may be selectively enabled for corresponding ones of the power configurations of the computing element.

20 Claims, 8 Drawing Sheets

(56) References Cited

U.S. PATENT DOCUMENTS

| | | |
|---|---|---|
| 2011/0285203 A1 | 11/2011 | Shih |
| 2012/0051097 A1 | 3/2012 | Zhang et al. |
| 2013/0058141 A1 | 3/2013 | Oraw et al. |
| 2016/0352219 A1 | 12/2016 | Amgad Abdulslam et al. |
| 2020/0006974 A1 | 1/2020 | Ghosh et al. |
| 2020/0036210 A1* | 1/2020 | Muratsu ................ H02M 3/158 |
| 2021/0382511 A1* | 12/2021 | Kim ....................... G05F 1/613 |
| 2022/0123656 A1* | 4/2022 | Wu ........................ H02M 3/157 |
| 2022/0187888 A1* | 6/2022 | Henspeter .............. H02M 1/00 |

* cited by examiner

SCALABLE, HIERARCHICAL POWER DELIVERY SYSTEM

BACKGROUND

Technical Field

This disclosure relates to electronic circuits, and more particularly, to power delivery and control systems.

Description of the Related Art

Computers and other types of electronic systems come in a wide variety of forms. As such systems need to be provided power to operate, power delivery systems also come in a correspondingly wide variety of configurations. A power delivery system may, in some cases, be as simple as a single circuit to provide a regulated supply voltage, or can be as complex as a corresponding system that requires a number of different operating voltages at different currents. To manage the overall efficiency of the system the design of a power delivery system for a particular load configuration may have a complexity that is commensurate with that load.

SUMMARY

A hierarchical, scalable power delivery system is disclosed. In one embodiment, the power delivery system includes a first level of power converter circuitry configured to generate one or more first level regulated supply voltages, and a second level of power converter circuitry configured to generate one or more second level regulated supply voltages. The first level of power converter circuitry receives an input supply voltage, while the second level power converter circuitry receives the one or more first level supply voltages. The second level power converter circuitry is configured to provide the second level regulated supply voltages to a computing element configured to operate as a single, logical computer system, the computing element being configured to operate in a number of power configurations having differing numbers of load circuits. Different portions of the hierarchical power delivery system may be selectively enabled for corresponding loads of the power configurations of the computing element.

In various embodiments, the design of the power delivery system of the present disclosure may be re-used in a number of different configurations of the computing element (and more generally, of a scalable electronic system). The computing element in one embodiment comprises a scalable computing architecture, the various implementations thereof being transparent to software executing thereon. Accordingly, the scalable computing architecture may, in various implementations, comprise a portion of an integrated circuit, the entirety of a single integrated circuit, or multiple instances of an integrated circuit coupled to one another in a package but otherwise operating as a computing element that is seen as a single entity by software. The power delivery system disclosed herein may be scaled according to the particular implementation of the computing element such that the design can be used for each of the different configurations. The enabled portions of the power delivery system selected based on the particular implementation of the computing element.

BRIEF DESCRIPTION OF THE DRAWINGS

The following detailed description makes reference to the accompanying drawings, which are now briefly described.

DETAILED DESCRIPTION OF EMBODIMENTS

Figure 1:
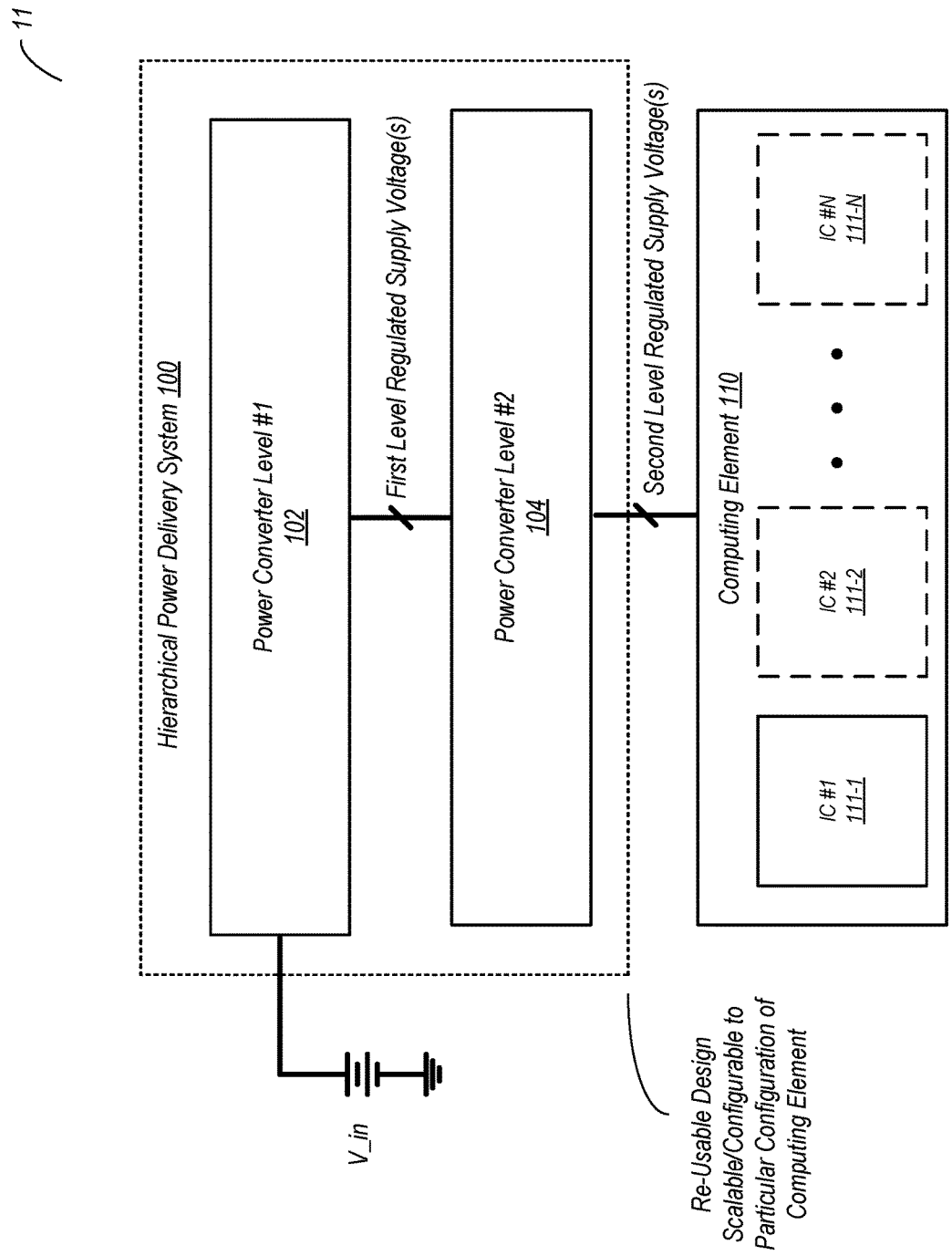
FIG. 1 is a block diagram of one embodiment of a power delivery system.

A scalable, hierarchical power delivery system is disclosed. The power delivery system of the present disclosure is usable in a number of different implementations of a computing element that is scalable from a portion of an integrated circuit up to a number of different integrated circuits.

Generally speaking, different computer systems have different power requirements, and accordingly, have different power delivery systems. These power delivery systems may be custom-designed for the particular computer system. Present trends in computing include the advent of scalable computing architectures. A scalable computing architecture may include various implementations having different levels of functionality while otherwise appearing transparent to software executing thereon. For example, a scalable computing architecture in accordance with this disclosure could include a less-than-full portion of an integrated circuit, a full portion of the integrated circuit, or multiple versions of the integrated circuit. From an instruction set architecture (ISA) point of view, the different versions of the scalable computing architecture may nevertheless employ a common ISA. Furthermore, operating system software, for example, may operate in largely the same manner on the various configurations of the scalable computing architecture. However, such scalable architectures may necessitate the use of custom-designed power delivery systems for the various configurations thereof. Custom-designed power delivery systems can significantly increase the complexity in realizing different configurations of a computing architecture having a number of different configurations. The present disclosure thus contemplates a hierarchical power delivery system that is scalable to suit the various implementations of a scalable computing architecture, with a common design that can be re-used among a number of different configurations.

In various embodiments, the power delivery system includes a first (top) level of one or more power converters (e.g., switching power converters, such as buck converters) that are coupled to receive an input voltage from an input voltage source (e.g., a battery, AC power, etc.). Using the input voltages, power converters of the first level generate one or more supply voltages to be supplied to power converters of the second level. The second level includes power converters that, using the supply voltage(s) received from the first level, generate one or more second level regulated supply voltages, which may be provided to various loads in the system. The number of power converters enabled in the levels of the power delivery system may be configured to correspond with the number of loads within the computing element to be supplied. For example, a first number of power converters are enabled for a single die/integrated circuit (IC) version of the computing element, while a second number of power converters are enabled for a multiple die/IC version of the computing element.

The scalability discussed herein may allow the same basic design of the power delivery system to be used in a number of different configurations. Within the power delivery system, power converters may be enabled or disabled in accordance with the particular configuration of the scalable computing architecture to which it provides power. This may advantageously obviate any need for custom designs for the various, different configurations of the scalable computing architecture. Accordingly, the design of the power delivery system disclosed herein may be used in a wide variety of different configurations and devices, examples of which are discussed below in reference to FIG. 8.

Furthermore, while the discussion above has been directed to a power delivery system for a scalable computing architecture, the present disclosure contemplates a power delivery system that may be used in a wide variety of electronic systems that have a scalability aspect. Furthermore, the term computing architecture may be broadly interpreted to cover a wide variety of systems and devices (including, but not limited to those discussed below) in which computing operations are carried out.

Further details of the hierarchical, scalable power delivery system will now be discussed, beginning with a basic overview of one embodiment. Thereafter, the discussion continues with an embodiment of the power delivery system as used in three different implementations of a scalable computing architecture. The disclosure continues with a discussion of control buses within an embodiment of the power delivery system, an example of a coupled-inductor power converter used in portions thereof, and an embodiment of a fabrication system which can be used to manufacture the power delivery system based on information stored on a computer readable medium. The description concludes with examples of a number of different systems in which a particular embodiment of the power delivery system may be implemented, wherein the different systems implement a common, scalable computing architecture.

Hierarchical, Scalable Power Delivery System:

Turning now to FIG. 1, a block diagram of a system having a hierarchical power delivery system and a computing element is shown. In the embodiment shown, system 11 includes a hierarchical power delivery system 100 and a computing element 110. Hierarchical power delivery system 100 includes a first power converter level 102 that is coupled to receive an input voltage, V_in, from an external source, e.g., a battery. The first power converter level 102 includes one or more power converters configured to generate one or more first level regulated supply voltages. These first level regulated supply voltages are received by one or more power converters of a second power converter level 104. The power converters of power converter level 104, using the one or more first level regulated supply voltages, generate one or more second level regulated supply voltages. These voltages are provided to the various loads of computing element 110.

In the embodiment shown, computing element 110 includes one or more integrated circuits (ICs) 111, shown here generally as ICs 111-1 to 111-N. Computing element 110 is configurable and scalable, with the number of ICs varying from one implementation to the next. For example, in a first implementation, computing element 110 may comprise a single IC die, whereas, in a second implementation, computing element 110 may comprise two or more IC dies. Implementations in which only a portion of an IC die are enabled are also possible and contemplated.

While computing element 110 is thus scalable, the number of ICs of a particular implementation is transparent to software executing thereon. Thus, irrespective of the number of particular ICs in a given implementation, the software executing thereon may see computing element 110 as a single entity. Accordingly, computing element 110 in the embodiment shown may implement a computing architecture that can be scaled up or down as desired, and capable of executing software on the various implementations without regard to this scaling.

Each IC 111-1 to 111-N in the embodiment shown may include a number of different types of circuits. For example, the ICs 111-1 to 111-N may include, various types of processor cores, graphics processing units (GPUs), neural network processors, memory controllers, input/output (I/O) circuits, network switches for implementing various networks thereon, and so forth. When two or more instances of IC 111-1 to 111-N are implemented to form a computing element, the various functional circuits thereon may form larger complexes than those of an implementation using a single IC or a portion thereof. For example, the ICs 111-1 and 111-N may each include a complex of processor cores, and thus in an implementation of computing element 110 having two or more ICs, a larger complex of processor cores spanning across a number of ICs is realized. The processor cores of one IC may communicate with those of another through one or more die-to-die interfaces between the individual ICs.

Given the differing power requirements from the different types of circuitry implemented on an instance of IC 111-1 to 111-N, multiple power converters generating corresponding voltages to meet the efficiency requirements of these loads may thus be present. For example, processor cores may have different power requirements than I/O circuits. Accordingly, power converter level 104 may include one or more power converters suitable for providing a first second level supply voltage to the processor cores, and one or more power converters providing a different second level supply voltage to the I/O circuits.

Hierarchical power delivery system 100 in the embodiment shown is also scalable, mirroring the scalability of computing element 110. In various embodiments, the power converter levels of hierarchical power delivery system 100 may include a number of power converters (e.g., switching voltage regulators, and the like) to meet the electrical requirements of the various loads, as discussed above. The number of power converters that are enabled for a particular implementation may thus correspond to the number of ICs 111-1 to 111-N in the particular implementation of computing element 110. More generally, power converters levels 102 and 104 may be arranged to enable more power supplying capacity as more computing capacity is implemented in computing element 110. In this manner, the design of hierarchical power delivery system 100 is re-usable for a number of different implementations of computing element 110. The re-use of the design of hierarchical power delivery system 100 across the range of scalability of computing element 110 may in turn obviate the need to provide custom power delivery solutions for various different implementations. This in turn can significantly simplify the design of various systems based on varying implementations of computing element 110, as well as reducing the amount of time to realize a working system for any particular implementation of such a design.

Figure 2:
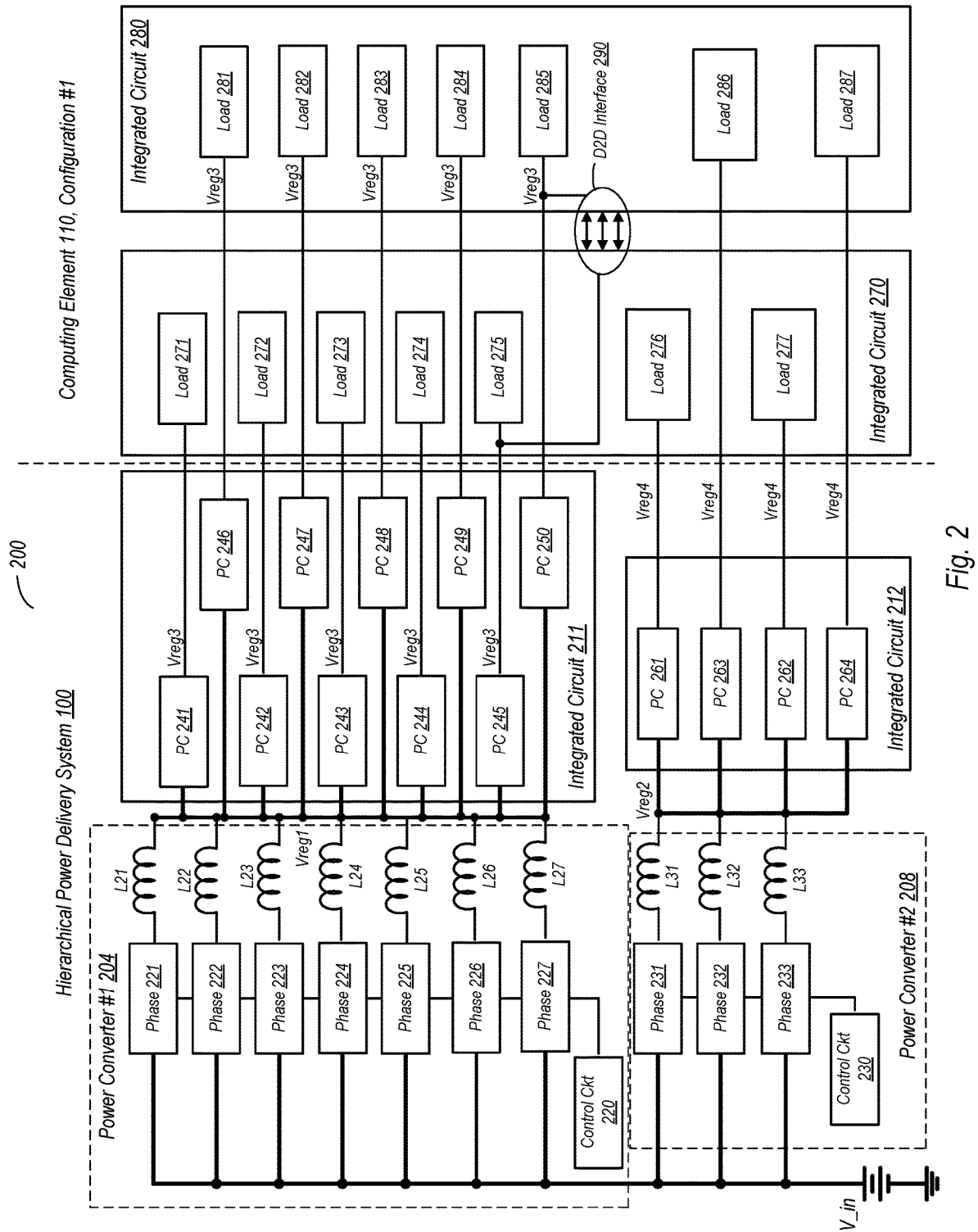
FIG. 2 is a block diagram of one embodiment of a power delivery system configured for a first load configuration.

Example Configurations of Power Delivery System in a Scalable Computing Architecture FIG. 2 is a block diagram illustrating one embodiment of a power delivery system implemented for a first load configuration. In the embodiment shown, system 200 includes an implementation of hierarchical power delivery system 100, and a corresponding implementation of computing element 110. In this example, computing element 110 includes two integrated circuits, ICs 270 and 280 that are coupled to one another via a die-to-die (D2D) interface 290. The D2D interface 290 may be used to facilitate communications between the chips and to extend networks that may be implemented on both ICs. For example, if both ICs 270 and 280 include a network of processor cores, D2D interface 290 facilitates the combining of the on-chip networks to form a larger network of processor cores spanning both ICs.

The ICs 270 and 280 of this implementation of computing element 110 are powered by a correspondingly scaled implementation of hierarchical power delivery system 110. In the embodiment shown, a first level of power converters is implemented by power converter 204 and power converter 208. Power converter 204 in the embodiment shown is a multi-phase switching power converter having phases 221-227, each coupled to a corresponding one of inductors L21-L27. Each of the phases is coupled to receive an input voltage V_in from a corresponding input voltage source. The inductors are coupled to a common node, Vreg1, on which a first regulated supply voltage is provided. A control circuit 220 in the embodiment shown is configured to control operation of power converter 204. The control functions carried out by control circuit 220 may include activating or deactivating particular ones of the phases 221-227 depending on, e.g., load current demands, controlling and switching operation between various modes such as pulse frequency modulation (PFM) and pulse width modulation (PWM), start-up of the various phases, and so on.

It is noted that each of the phases 221-227 shown here are considered enabled, which is defined herein as having the ability to become active, even if it is currently inactive. In contrast, as will be discussed with additional examples, a disabled phase as defined herein as a phase that has had its capacity to become active removed such that it remains inactive during the entirety of operation.

Power converter 208 in the embodiment shown is another first level power converter. Similar to power converter 204, power converter 208 in the embodiment shown is also a multi-phase switching power converter, with phases 231-233 coupled to receive the input voltage V_In. Each of the phases 231-233 is coupled to a corresponding inductor L31-L33, which in turn are coupled to one another at a common voltage supply node, VReg2 upon which a corresponding second regulated supply voltage is provided. Control circuit 230 in the embodiment shown may carry out the functions of adding or shedding enabled ones of the phases 231-233 during operation, depending on load current demand, controlling operational modes (e.g., PFM, PWM), and so forth.

In various embodiments, power converters 204 and 208 are buck converters, providing corresponding regulated supply voltages that are less than the input voltage V_in. However, embodiments that implement a first-level boost converter are possible and contemplated. It is further noted that the regulated supply voltages in this example embodiment, Vreg1 and Vreg2, may be different from one another, although embodiments in which these voltages are substantially the same are also possible. Power converters 204 and 208 may be implemented using various different combinations of integrated circuits. For example, the control circuits 220 and 230 may be implemented on a common integrated circuit die. Meanwhile, the phases of the converters may be implemented separately on different integrated circuits. Embodiments are possible and contemplated in which high-side switches, low-side switches, and driver switches are all implemented on different integrated circuit dies with respect to one another. Embodiments in which these different integrated circuit dies are integrated into a common package are also possible and contemplated. Generally speaking, the disclosure contemplates a wide variety of different physical implementations for power converters 204 and 208.

A second level of power converters in the embodiment shown is implemented by the power converters of ICs 211 and 212. IC 211 in the embodiment shown includes a plurality of power converters 241-250, each of which is coupled to receive the first regulated voltage, Vreg1, from power converter 204 of the first level. Power converters 241-250 in this embodiment generate a third regulated supply voltage, Vreg3. In various embodiments, power converters 241-250 are buck regulators, and thus Vreg3 is a voltage that is less than Vreg1. However, embodiments in which power converters 241-250 are implemented as boost converters are possible and contemplated.

Various power converter architectures may be used to implement the power converters 241-250 of IC 211. In various embodiments, power converters 241-250 may be implemented as switching power converters, and may include at least one inductor (not shown here for the sake of simplicity) and a switching circuit. The switching power converters may be implemented as buck converters or boost converters, depending on the power requirements of the corresponding loads. In one embodiment to be discussed below, power converters 241-250 may be implemented as coupled-inductor power converters, in which pairs of inductors share a magnetic core and thus share magnetic fields. Embodiments in which the high side switch of the inductors is bootstrapped are also possible and contemplated. The present disclosure also contemplates power converters implemented as linear regulators, such as low dropout (LDO) voltage regulators. In general, the disclosure contemplates implementations of power converters 241-250 in a wide variety of embodiments, using different power converter architectures and control schemes.

Power converters 241-250 in the illustrated example are arranged to provide their respectively generated supply voltages to loads on ICs 270 and 280. More particularly, power converters 241-245 are arranged to provide corresponding instances of the third regulated supply voltage, Vreg3, to loads 271-275 (of IC 270), respectively. Meanwhile, power converters 246-250 are arranged to provide corresponding instances of the third regulated supply voltage to loads 281-285 (of IC 280), respectively. These loads can be various types of circuits, such as central processing unit (CPU) cores, graphics processing units (GPUs), or any other type of circuitry that operates based on the third regulated supply voltage. Additionally, one of the power converters in each of groups 241-245 and 246-250 is coupled to provide a supply voltage to its respective side of D2D interface 290.

IC 212 in the embodiment shown includes power converters 261-265, each of which is configured to generate respective instances of a fourth regulated supply voltage, Vreg4. As with power converters 241-250, power converters 261-265 may also be implemented as switching power converters that include respective inductors (not shown here) as energy storage elements. In various embodiments, power converters 261-264 may be implemented as single-inductor buck converters, although embodiments implementing them as coupled-inductor buck converters, boost converters or linear regulators (e.g., LDO regulators) are possible and contemplated. Each of the power converters 261-264 are coupled to receive the second regulated supply voltage, Vreg2, output from power converter 208. In buck converters and linear regulator embodiments, the regulated supply voltage Vreg4 may have a value that is less than that of Vreg2.

Power converters 261 and 262 in the embodiment shown are coupled to provide Vreg4 to load circuits 276 and 277, respectively, which are implemented on IC 270. Meanwhile, power converters 263 and 264 are coupled to provide Vreg4 to load circuits 286 and 287, respectively, on IC 280. The load circuits receiving Vreg4 may be virtually any type of circuitry for which Vreg4 is a suitable supply voltage. Such load circuits can include (but are not limited to) memory circuits, various types of power management circuits implemented on ICs 270 and 280, I/O circuits, and so on.

In various embodiments, a selected one of power converters 261 may include control circuitry that is operable to control the start-up sequencing of other power converters in hierarchical power delivery system 100, as will be discussed in further detail below.

Embodiments are also possible and contemplated in which various ones of the power converters may be powered down or put into a sleep mode, e.g., when their respective load circuits are idle. For example, in one embodiment, power converter 204, power converters 241-250, and power converters 261-264 may all be turned off in the event that their correspondingly coupled load circuits are idle.

Embodiments are also contemplated in which at least one power converter is an "always on" power domain converter. As used herein, the term "always on" is defined as continuing to operate as long as it is receiving an input voltage. In one embodiment, power converter 208 may be an "always on" power converter, continuing to operate when it is receiving power from the input voltage source, V_in. Nevertheless, in embodiments in which power converter 208 is implemented as a multi-phase converter as shown here, some phases may be de-activated when its correspondingly coupled load circuits (power converters 261-264) are not operating. For example, if power converters 261-264 are inactive, two of the three phases of power converter 208 may be inactive at any given time, with only a single phase being used to deliver the regulated supply voltage Vreg2. However, the use of certain rotating modes during such operation, wherein the active phase is rotated among the various phases of a multi-phase power converter, is possible and contemplated. For example, control circuit 230 could cycle between activating phase 231 for a first cycle, phase 232 for a next cycle, and phase 233 for a cycle following that.

The example shown in FIG. 2 contemplates a full implementation for one particular embodiment of a scalable computing architecture that can utilize two separate ICs to form a single computing element, with a corresponding full implementation of the power delivery system 100. It is noted however that this embodiment is not intended to be limiting. Embodiments that can be scaled up to 4, 8, or any other number of ICs to implement a single computing element are possible and contemplated, and thus the same applies to a power delivery system for such a scalable computing architecture.

Figure 3:
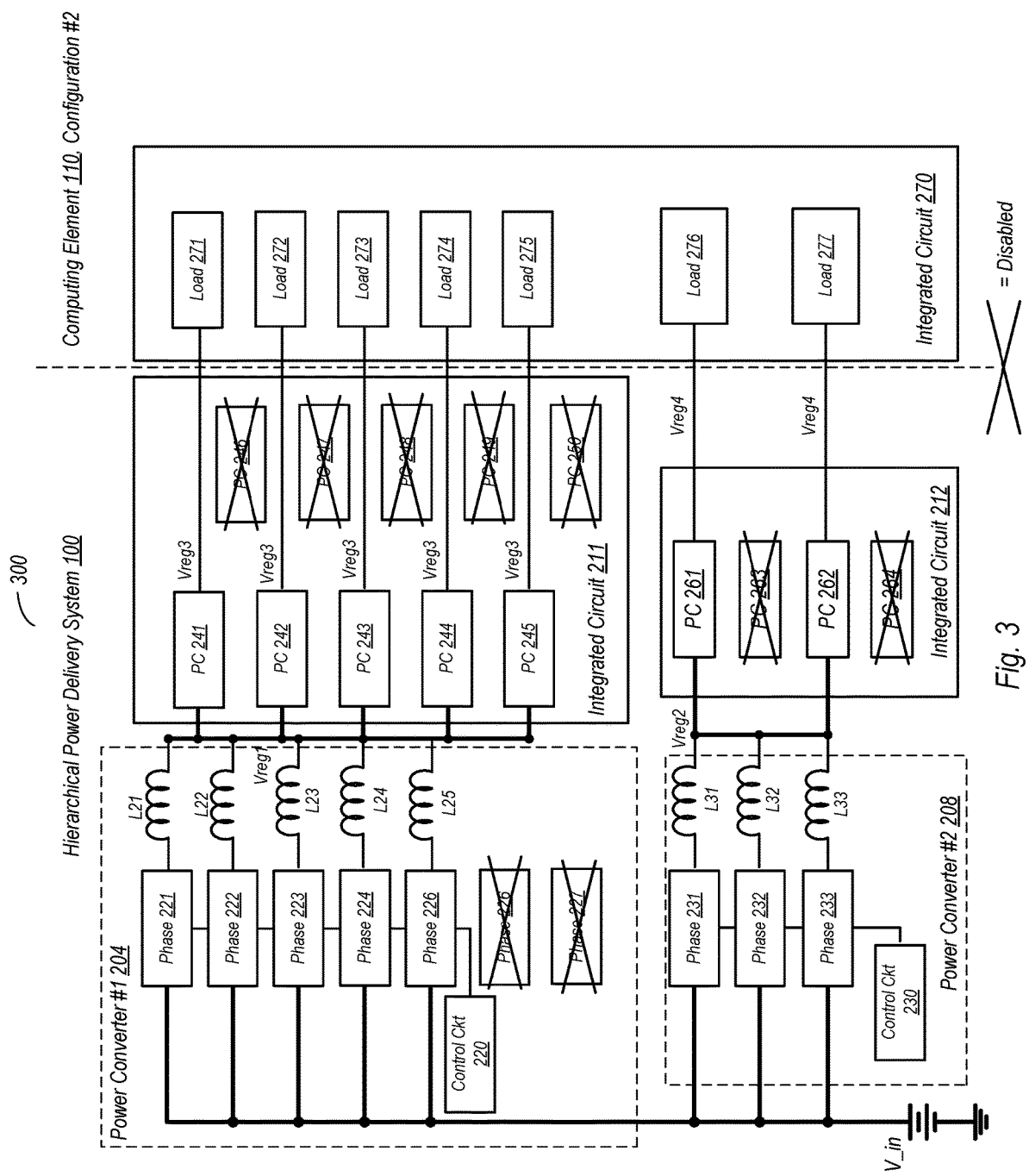
FIG. 3 is a block diagram of one embodiment of a power delivery system configured for a second load configuration.

FIG. 3 illustrates the embodiment of the power delivery system discussed herein as implemented for a second load configuration. In this particular example, the scalable computing architecture of system 300 has been scaled down to use a single IC to form the computing element. When the computing element is implemented with only a single IC, the number of load circuits to be supplied is less relative to the two IC embodiment of FIG. 2. Accordingly, hierarchical power delivery system 100 is scaled correspondingly, with selected ones of the power converters and/or phases thereof disabled. As defined herein, the term "disabled" is not to be confused with the term "inactive". Per the definition of this disclosure, an inactive power converter or phase thereof may be re-activated as needed in accordance with operational needs. For example, inactive phases of power converters 204 and 208 may be de-activated during "low power" scenarios and are then activated as load current increases. In contrast, a disabled power converter or phase thereof, as defined herein, is permanently inhibited from activation and thus remains inactive throughout the operation of power delivery system 100. In various embodiments, a disabled power converter may be present on an IC with other ones of the enabled power converters, but be disabled by virtue of some mechanism (e.g., blown fuses) which render it permanently inoperative. In other embodiments, the power converters designated as disabled may not even be present to begin with. Accordingly, the definition of the disabled per the present disclosure is intended to include power converters that are present but rendered permanently inoperative by some particular mechanism, as well as not being present at all in implementations less than the fully-scaled design. Furthermore, as defined herein, a power converter or phase thereof is considered enabled if it is capable of being activated to contribute to providing power to its respective load circuit, even if it is inactive at a given time.

In this example, phases 226 and 227 of power converter 204 are disabled, as phases 221-225 are sufficient to provide load current for the reduced configuration of its corresponding load of power converters 241-245. Although phases 226 and 227 may be physically present in this configuration, they are disabled here as the first supply voltage, Vreg1, can be more efficiently provided with the five remaining phases (phases 221-225) that are enabled. The disabling of phases that are to remain permanently unused for a particular configuration may be accomplished in various ways, such as through blowing fuses in a fuse network, or through a mechanism causing control circuit 220 to ignore the presence of the disabled phases. Furthermore, as noted above, embodiments are possible and contemplated in which those phases designated as disabled are not present to begin with.

Power converters 241-245 of IC 211 are enabled in the illustrated example and are thus configured to generate respective instances of Vreg3 based on Vreg1 as provided from the correspondingly coupled configuration of power converter 204. As the computing element 110 in this configuration includes only IC 270, there are no loads to be powered by power converters 246-250. Accordingly, power converters 246-250 are disabled in this configuration. This allows the system to reduce the power conversion losses in the overall power delivery architecture.

With regard to power converter 208, all three phases thereof remain enabled for the configuration shown in FIG. 3. However, only power converters 261 and 262 of IC 212 are enabled, providing corresponding instances of Vreg4 to load circuits 276 and 277, respectively. Meanwhile, power converters 263 and 264 are disabled in the illustrated embodiment, as there are no corresponding load circuits needing power.

Figure 4:
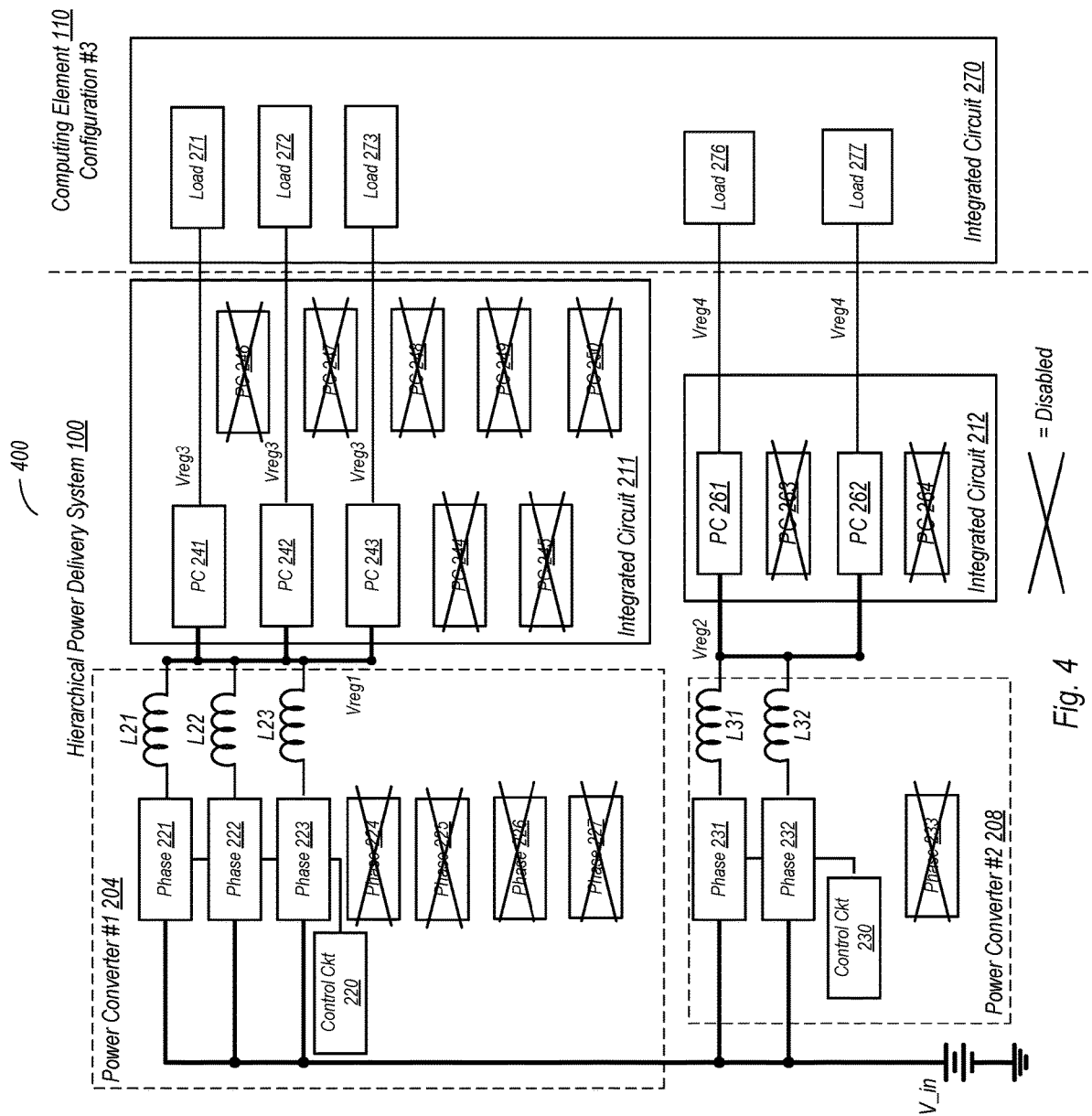
FIG. 4 is a block diagram of one embodiment of a power delivery system configured for a third load configuration.

FIG. 4 illustrates the embodiment of the power delivery system discussed herein as implemented for a third load configuration. In the configuration of system 400, the computing element enables only a portion of the circuitry on IC 270. This may be referred to as a "chop die" configuration. For example, if the configuration of system 300 shown in FIG. 3 includes a computing element having 16 enabled processor cores on IC 270, the computing element of system 400 in FIG. 4 may have only 8 of the cores enabled, with the remaining cores disabled. Additionally, while loads 276 and 277 are both still present on IC 270, their power requirements here are reduced due to the reduction of functionality in other areas of the chip.

As the configuration shown in FIG. 4 has reduced power requirements relative to the previously discussed configurations, hierarchical power delivery system 100 may also be scaled accordingly. In this particular configuration, only power converters 241, 242, and 243 of IC 211 are enabled, with power converters 244-250 being disabled as a result of the loads utilizing instances of Vreg3 having been reduced to loads 271, 272, and 273. Since IC 211 acts as a load for power converter 204, the number of enabled phases in the latter is correspondingly reduced, with phases 221-223 being enabled while phases 224-227 are disabled. The reduced power requirements of loads 276 and 277 in this configuration further results in the effect of reducing the requirements of power converter 208. Accordingly, phases 231 and 232 are enabled in this configuration, while phase 233 is disabled.

It is noted that the various configurations of the scalable computing architecture of computing element 100 and the corresponding configurations of hierarchical power delivery system are illustrated and discussed here by way of example. However, the scope of this disclosure is not limited to the embodiments and examples discussed herein. On the contrary, the disclosure contemplates a wide variety of embodiments of a scalable power delivery system and, correspondingly, scalable electronic systems (e.g., computing architectures) arranged to receive power from an appropriate embodiment of the former. Within a given embodiment of a scalable power delivery system, the number and types of power converters may be any combination that is suitable for the scalable electronic system to be powered thereby.

Figure 5:
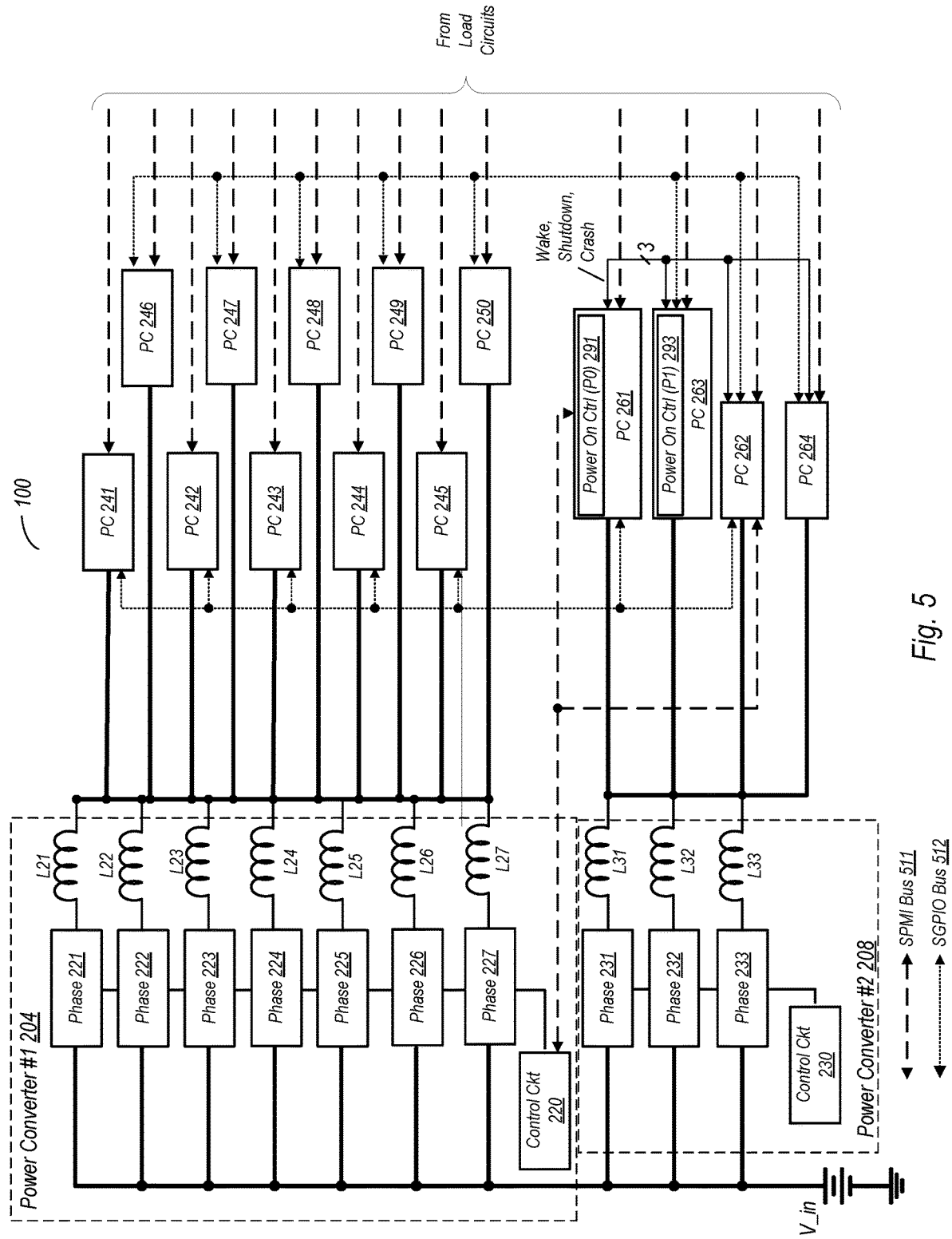
FIG. 5 is a block diagram of one embodiment of a power delivery system having various control buses coupled between the elements thereof.

Control Infrastructure for Power Delivery System:

FIG. 5 is a block diagram illustrating one embodiment of a control infrastructure for the corresponding embodiment of hierarchical power delivery system 100 as discussed above. In the embodiment shown, a number of different signaling buses are provided to connect various control circuits associated with the different levels of power delivery system 100. It is noted that certain bus types and interfaces are discussed here by way of example, but are not intended to limit the disclosure. On the contrary, the present disclosure contemplates a wide variety of implementations for implementing a control infrastructure for a power delivery system.

As shown in FIG. 5, each of the power converters 241-250, 261-265, and 208 include a System Power Management Interface (SPMI), with control circuit 220 (of power converter 208), power converter 261, and power converter 263 coupled to one another via an SPMI bus 511. Additionally, each of power converters 241-250 and 261-264 include an SPMI interface for coupling to a corresponding load circuit (not shown here). The load-facing SPMI interface on each of power converters 241-250 as well as those on power converters 261-264 are coupled to internal controllers (not shown). Commands may be received through these particular SPMI interfaces. Additionally, certain load circuits may be coupled to a power manager circuit within its respective IC to form corresponding point-to-point connections to internal controllers of the power converters 241-250 and 261-264. Through these interfaces and across SPMI bus 511, the controllers of the various power converters may receive commands to change voltage, change operational modes, start operation, stop operation, and so on. Additionally, controllers in certain ones of the power converters may initiate control functions across the SPMI bus 511.

The control infrastructure also includes a Serial General Purpose I/O (SGPIO) bus 512 coupled between power converters 261-264 and power converters 241-250. Power converter 261 includes a first power-on controller 291 while power converter 263 includes a second power on controller 293. The first power-on controller 291 in the embodiment shown may act as a first primary controller for controlling a power-up sequence of power converter 204, power converters 241-245, and power converters 261-263. A second power-on controller 293 may act as a second primary controller to control the power-up sequence of power converters 246-250 and 264. In one embodiment, these control functions may be carried out via the SPMI bus 511 and SGPIO bus 512. For example, power-on controller 291 may initiate a power up sequence for power converter 204 via SPMI bus 511 followed by initiating power on sequencing for power converters 241-245 via SGPIO bus 512. As the first power-on controller 291 and second power-on controller 293 are configured to control power-up sequences for respectively coupled power converters, they may also control power-down sequences as well.

A multi-pin control bus is also coupled between each of power converters 261-264. Through this bus, wake commands may be conveyed (e.g., from power on controller 291 to control circuitry in power converters 262) to cause these converters to, e.g., wake from a sleep state. A shutdown command may also be conveyed to put these converters in a sleep state or to turn them off for a system shutdown. The crash command may also initiate a shutdown that results from a system crash.

Figure 6:
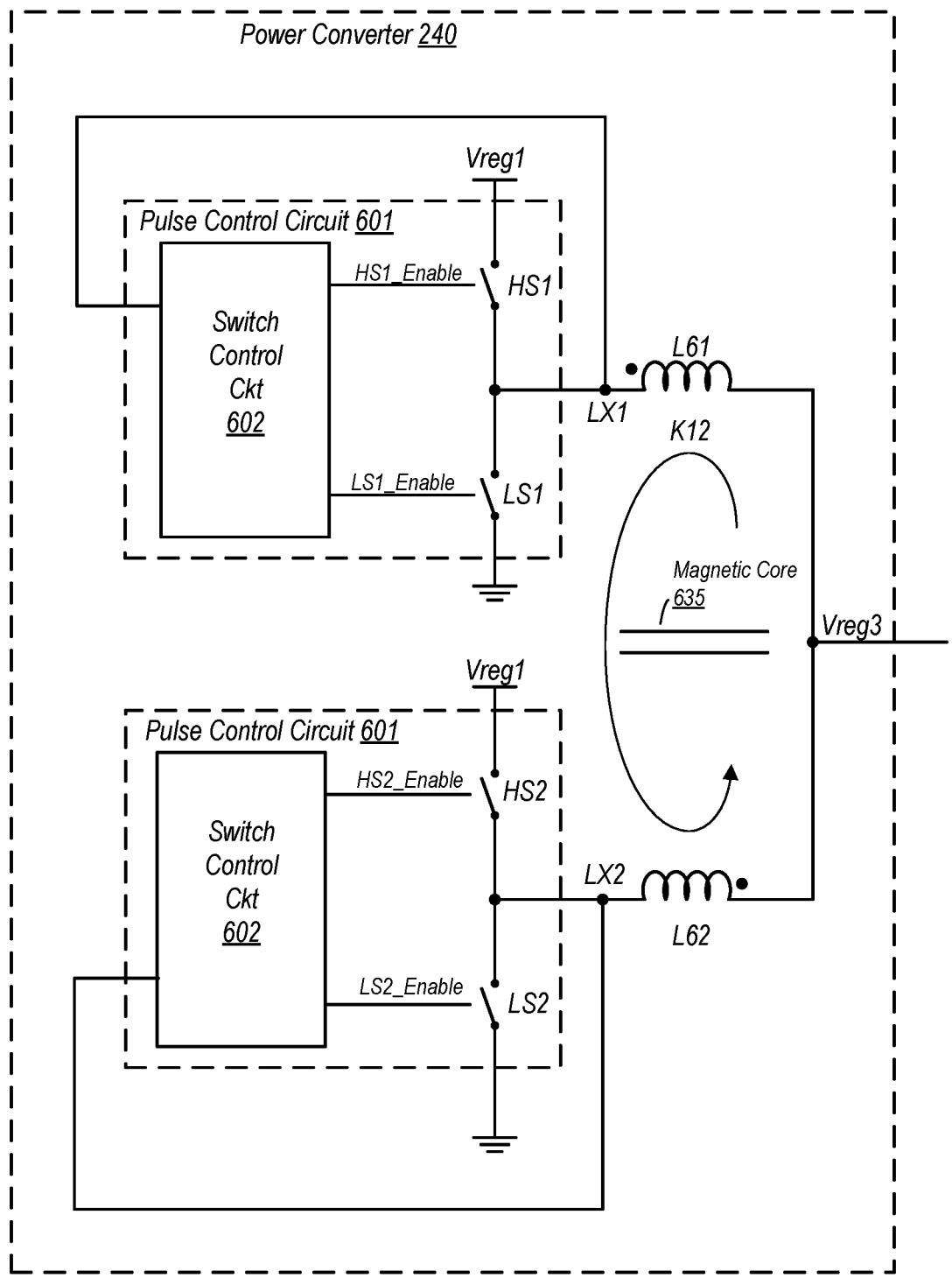
FIG. 6 is a block diagram of a switching power converter used to generate a regulated supply voltage for a portion of a power delivery system.

Coupled-Inductor Power Converter:

FIG. 6 is a schematic diagram of one embodiment of a coupled inductor power converter. Various ones of the power converters in the power delivery systems falling within the scope of this disclosure may be implemented using a coupled inductor configuration. For example, power converters 241-250 in one embodiment may be implemented as coupled inductor power converters. These types of power converters may provide high efficiency and fast transient response, thus making them suitable for low voltage, high speed loads, such as processor cores, and so on.

In the embodiment shown, power converter 240, as noted above, may correspond to various power converters in the power delivery systems discussed herein, such as power converters 241-250. Power converter 240 includes two inductors, LS1 and LS2, which share a common magnetic core 635, and have a coupling factor of K12. Both of inductors LS1 and LS2 in this embodiment are coupled to one another at the regulated voltage supply node labeled Vreg3.

A first instance of pulse control circuit 601 of power converter 240 includes a switch control circuit 602 that is operable to control switching of a high side switch HS1 and a low side switch LS1. Both of these switches are coupled to a switching node LX1, which in turn is coupled to inductor LS1 and is further coupled to a feedback loop that is provided to switch control circuit 602. Switch control circuit 602 may alternately activate high side switch HS1 (to couple LX1 to the input voltage, Vreg1) and LS1 (to couple LX1 to ground). A second instance of pulse control circuit 601 operates in the same manner as first pulse control circuit 601. The second instance of pulse control circuit 601 includes another instance of switch control circuit 602, high side switch HS2 and low side switch LS2, which are coupled to inductor L62 at switching node LX2.

During operation, the switch control circuits 602 may cause their respective counterpart switches to operate in opposite phases of one another. Thus, when HS1 is active, HS2 is inactive, and vice versa. Similarly, when LS1 is active, LS2 is inactive.

The coupled inductor power converter 240 shown in FIG. 6 represents one possible variation among a number of possibilities for the power converters used at the different levels of power delivery system 100 and the various embodiments thereof. Embodiments in which a high side switch is bootstrapped (e.g., implemented using an NMOS device, with additional circuitry to drive its gate voltage) are also possible and contemplated. As further noted, the disclosure contemplates the use of buck and boost converters, as well as the use of linear voltage regulators.

Figure 7:
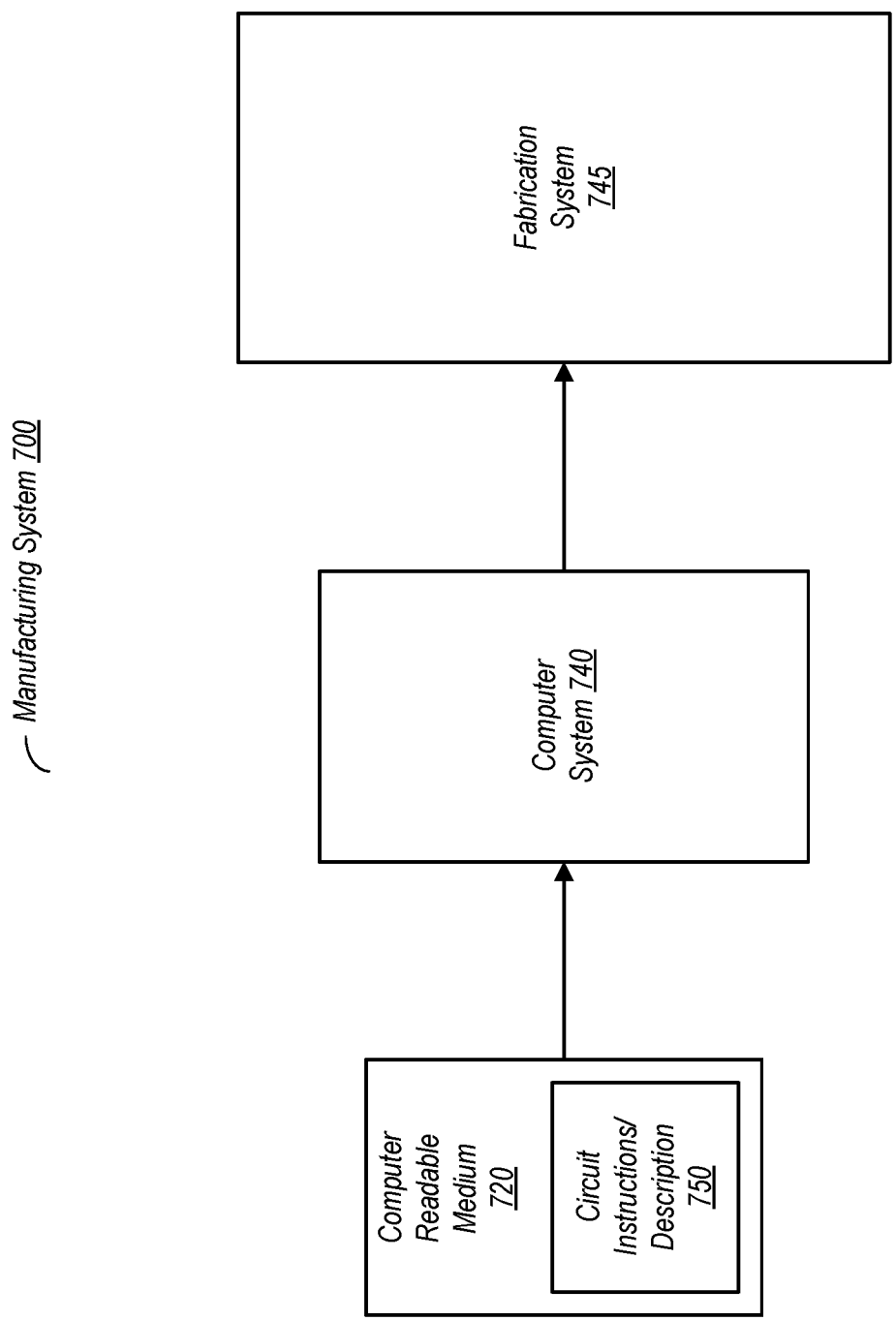
FIG. 7 is a block diagram illustrating one embodiment of a computer system, a computer readable medium, and a fabrication system.

Computer Readable Medium and Fabrication System:

FIG. 7 is a block diagram of one embodiment of a manufacturing system 700. The system includes a non-transitory computer readable medium 720 having stored thereon a instructions/description 750 of a power delivery system of any embodiment falling within the scope of this disclosure. The computer readable medium 720 may be one of a number of different types of non-transitory media, including disk storage, solid state drive (e.g., using flash memory), optical storage (e.g., CD-ROM), various types of random access memory (RAM), and so on, that are capable of providing persistent storage of information.

A computer system 740 is configured to read the circuit instructions/description 750 from computer readable medium 720. Furthermore, computer system 740 may execute the various instructions and used the circuit description to cause fabrication system 745 to manufacture one or more instances of the circuit represented by circuit instructions/description 750. Fabrication system 745 may be any type of automated system that can manufacture electronic circuits.

Example System

Figure 8:
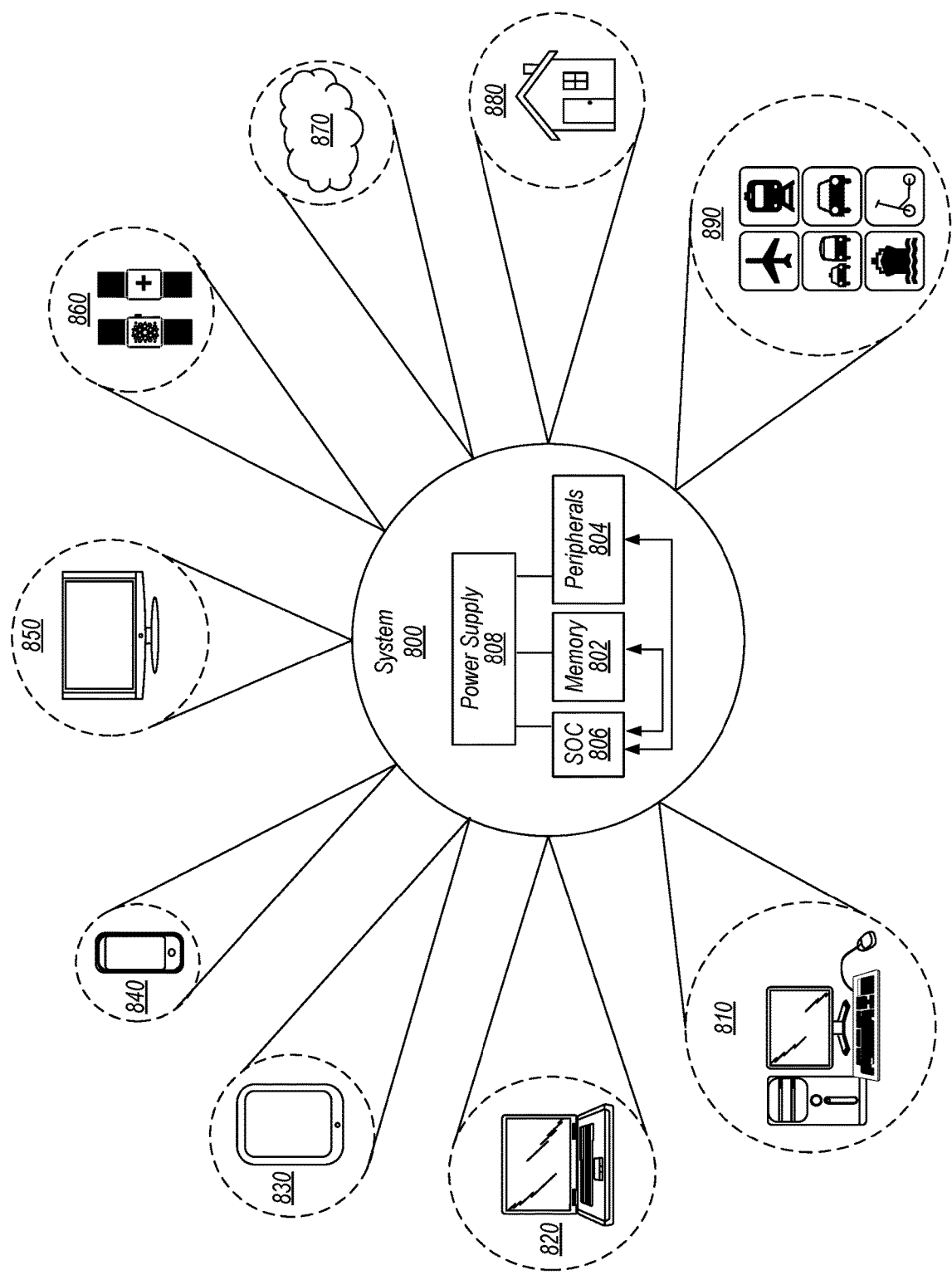
FIG. 8 is a block diagram of one embodiment of an example system.

Turning next to FIG. 8, a block diagram of one embodiment of a system 800 is shown that may incorporate and/or otherwise utilize the methods and mechanisms described herein. In the illustrated embodiment, the system 800 includes at least one instance of a system on chip (SoC) 806 which may include multiple types of processing units, such as a central processing unit (CPU), a graphics processing unit (GPU), or otherwise, a communication fabric, and interfaces to memories and input/output devices. In some embodiments, one or more processors in SoC 806 include multiple execution lanes and an instruction issue queue. In various embodiments, SoC 806 is coupled to external memory 802, peripherals 804, and power supply 808.

A power supply 808 is also provided which supplies the supply voltages to SoC 806 as well as one or more supply voltages to the memory 802 and/or the peripherals 804. In various embodiments, power supply 808 represents a battery (e.g., a rechargeable battery in a smart phone, laptop or tablet computer, or other device). In some embodiments, more than one instance of SoC 806 is included (and more than one external memory 802 is included as well).

The memory 802 is any type of memory, such as dynamic random access memory (DRAM), synchronous DRAM (SDRAM), double data rate (DDR, DDR2, DDR3, etc.) SDRAM (including mobile versions of the SDRAMs such as mDDR3, etc., and/or low power versions of the SDRAMs such as LPDDR2, etc.), RAIVIBUS DRAM (RDRAM), static RAM (SRAM), etc. One or more memory devices are coupled onto a circuit board to form memory modules such as single inline memory modules (SIMMs), dual inline memory modules (DIMMs), etc. Alternatively, the devices are mounted with a SoC or an integrated circuit in a chip-on-chip configuration, a package-on-package configuration, or a multi-chip module configuration.

The peripherals 804 include any desired circuitry, depending on the type of system 800. For example, in one embodiment, peripherals 804 includes devices for various types of wireless communication, such as Wi-Fi, Bluetooth, cellular, global positioning system, etc. In some embodiments, the peripherals 804 also include additional storage, including RAM storage, solid state storage, or disk storage. The peripherals 804 include user interface devices such as a display screen, including touch display screens or multi-touch display screens, keyboard or other input devices, microphones, speakers, etc.

As illustrated, system 800 is shown to have application in a wide range of areas. For example, system 800 may be utilized as part of the chips, circuitry, components, etc., of a desktop computer 810, laptop computer 820, tablet computer 830, cellular or mobile phone 840, or television 850 (or set-top box coupled to a television). Also illustrated is a smartwatch and health monitoring device 860. In some embodiments, smartwatch 860 may include a variety of general-purpose computing related functions. For example, a smartwatch may provide access to email, cellphone service, a user calendar, and so on. In various embodiments, a health monitoring device may be a dedicated medical device or otherwise include dedicated health related functionality. For example, a health monitoring device may monitor a user's vital signs, track proximity of a user to other users for the purpose of epidemiological social distancing, contact tracing, provide communication to an emergency service in the event of a health crisis, and so on. In various embodiments, the above-mentioned smartwatch may or may not include some or any health monitoring related functions. Other wearable devices are contemplated as well, such as devices worn around the neck, devices that are implantable in the human body, glasses designed to provide an augmented and/or virtual reality experience, and so on.

System 800 may further be used as part of a cloud-based service(s) 870. For example, the previously mentioned devices, and/or other devices, may access computing resources in the cloud (i.e., remotely located hardware and/or software resources). Still further, system 800 may be utilized in one or more devices of a home other than those previously mentioned. For example, appliances within the home may monitor and detect conditions that warrant attention. For example, various devices within the home (e.g., a refrigerator, a cooling system, etc.) may monitor the status of the device and provide an alert to the homeowner (or, for example, a repair facility) should a particular event be detected. Alternatively, a thermostat may monitor the temperature in the home and may automate adjustments to a heating/cooling system based on a history of responses to various conditions by the homeowner. Also illustrated in FIG. 8 is the application of system 800 to various modes of transportation. For example, system 800 may be used in the control and/or entertainment systems of aircraft, trains, buses, cars for hire, private automobiles, waterborne vessels from private boats to cruise liners, scooters (for rent or owned), and so on. In various cases, system 800 may be used to provide automated guidance (e.g., self-driving vehicles), general systems control, and otherwise. These any many other embodiments are possible and are contemplated. It is noted that the devices and applications illustrated in FIG. 8 are illustrative only and are not intended to be limiting. Other devices are possible and are contemplated.

The present disclosure further contemplates the use of a common, scalable computing architecture among some or all of the various devices illustrated in FIG. 8. Thus, a computing element may be scaled according to the needs of the particular system in which it is implemented. For example, smartwatch/health monitoring device 860 may use a first implementation of a computing element of a scalable architecture, while tablet computer 830 uses a second implementation, and desktop computer 810 uses a third implementation. In this particular example, the implementation of the computing element in tablet computer 830 may be scaled up relative to smartwatch/health monitoring device 860. Similarly, the implementation of the computing element in desktop computer 810 may be scaled up relative to that of tablet computer 830. Thus, each of these devices may utilize a common computing architecture that is implemented on a scale according to the needs of its respective system. In conjunction with the scalable architecture, a power delivery system in accordance with this disclosure may be provided in each of these applications and may be correspondingly scaled with the computing element. Thus, while each of the examples discussed here may utilize a power delivery system having a common design, the implementation for desktop computer 810 may have more power delivery capacity than that of tablet computer 830, which in turn has a greater power delivery capacity than that of smartwatch/health monitoring device 860. However, the common design of the power delivery system used among these different devices may significantly simplify their implementation, as the power delivery system can be configured for the particular application by enabling/disabling appropriate ones of the power converters therein.

The present disclosure includes references to "an "embodiment" or groups of "embodiments" (e.g., "some embodiments" or "various embodiments"). Embodiments are different implementations or instances of the disclosed concepts. References to "an embodiment," "one embodiment," "a particular embodiment," and the like do not necessarily refer to the same embodiment. A large number of possible embodiments are contemplated, including those specifically disclosed, as well as modifications or alternatives that fall within the spirit or scope of the disclosure.

This disclosure may discuss potential advantages that may arise from the disclosed embodiments. Not all implementations of these embodiments will necessarily manifest any or all of the potential advantages. Whether an advantage is realized for a particular implementation depends on many factors, some of which are outside the scope of this disclosure. In fact, there are a number of reasons why an implementation that falls within the scope of the claims might not exhibit some or all of any disclosed advantages. For example, a particular implementation might include other circuitry outside the scope of the disclosure that, in conjunction with one of the disclosed embodiments, negates or diminishes one or more the disclosed advantages. Furthermore, suboptimal design execution of a particular implementation (e.g., implementation techniques or tools) could also negate or diminish disclosed advantages. Even assuming a skilled implementation, realization of advantages may still depend upon other factors such as the environmental circumstances in which the implementation is deployed. For example, inputs supplied to a particular implementation may prevent one or more problems addressed in this disclosure from arising on a particular occasion, with the result that the benefit of its solution may not be realized. Given the existence of possible factors external to this disclosure, it is expressly intended that any potential advantages described herein are not to be construed as claim limitations that must be met to demonstrate infringement. Rather, identification of such potential advantages is intended to illustrate the type(s) of improvement available to designers having the benefit of this disclosure. That such advantages are described permissively (e.g., stating that a particular advantage "may arise") is not intended to convey doubt about whether such advantages can in fact be realized, but rather to recognize the technical reality that realization of such advantages often depends on additional factors.

Unless stated otherwise, embodiments are non-limiting. That is, the disclosed embodiments are not intended to limit the scope of claims that are drafted based on this disclosure, even where only a single example is described with respect to a particular feature. The disclosed embodiments are intended to be illustrative rather than restrictive, absent any statements in the disclosure to the contrary. The application is thus intended to permit claims covering disclosed embodiments, as well as such alternatives, modifications, and equivalents that would be apparent to a person skilled in the art having the benefit of this disclosure.

For example, features in this application may be combined in any suitable manner. Accordingly, new claims may be formulated during prosecution of this application (or an application claiming priority thereto) to any such combination of features. In particular, with reference to the appended claims, features from dependent claims may be combined with those of other dependent claims where appropriate, including claims that depend from other independent claims. Similarly, features from respective independent claims may be combined where appropriate.

Accordingly, while the appended dependent claims may be drafted such that each depends on a single other claim, additional dependencies are also contemplated. Any combinations of features in the dependent claims that are consistent with this disclosure are contemplated and may be claimed in this or another application. In short, combinations are not limited to those specifically enumerated in the appended claims.

Where appropriate, it is also contemplated that claims drafted in one format or statutory type (e.g., apparatus) are intended to support corresponding claims of another format or statutory type (e.g., method).

Because this disclosure is a legal document, various terms and phrases may be subject to administrative and judicial interpretation. Public notice is hereby given that the following paragraphs, as well as definitions provided throughout the disclosure, are to be used in determining how to interpret claims that are drafted based on this disclosure.

References to a singular form of an item (i.e., a noun or noun phrase preceded by "a," "an," or "the") are, unless context clearly dictates otherwise, intended to mean "one or more." Reference to "an item" in a claim thus does not, without accompanying context, preclude additional instances of the item. A "plurality" of items refers to a set of two or more of the items.

The word "may" is used herein in a permissive sense (i.e., having the potential to, being able to) and not in a mandatory sense (i.e., must).

The terms "comprising" and "including," and forms thereof, are open-ended and mean "including, but not limited to."

When the term "or" is used in this disclosure with respect to a list of options, it will generally be understood to be used in the inclusive sense unless the context provides otherwise. Thus, a recitation of "x or y" is equivalent to "x or y, or both," and thus covers 1) x but not y, 2) y but not x, and 3) both x and y. On the other hand, a phrase such as "either x or y, but not both" makes clear that "or" is being used in the exclusive sense.

A recitation of "w, x, y, or z, or any combination thereof" or "at least one of . . . w, x, y, and z" is intended to cover all possibilities involving a single element up to the total number of elements in the set. For example, given the set [w, x, y, z], these phrasings cover any single element of the set (e.g., w but not x, y, or z), any two elements (e.g., w and x, but not y or z), any three elements (e.g., w, x, and y, but not z), and all four elements. The phrase "at least one of . . . w, x, y, and z" thus refers to at least one element of the set [w, x, y, z], thereby covering all possible combinations in this list of elements. This phrase is not to be interpreted to require that there is at least one instance of w, at least one instance of x, at least one instance of y, and at least one instance of z.

Various "labels" may precede nouns or noun phrases in this disclosure. Unless context provides otherwise, different labels used for a feature (e.g., "first circuit," "second circuit," "particular circuit," "given circuit," etc.) refer to different instances of the feature. Additionally, the labels "first," "second," and "third" when applied to a feature do not imply any type of ordering (e.g., spatial, temporal, logical, etc.), unless stated otherwise.

The phrase "based on" is used to describe one or more factors that affect a determination. This term does not foreclose the possibility that additional factors may affect the determination. That is, a determination may be solely based on specified factors or based on the specified factors as well as other, unspecified factors. Consider the phrase "determine A based on B." This phrase specifies that B is a factor that is used to determine A or that affects the determination of A. This phrase does not foreclose that the determination of A may also be based on some other factor, such as C. This phrase is also intended to cover an embodiment in which A is determined based solely on B. As used herein, the phrase "based on" is synonymous with the phrase "based at least in part on."

The phrases "in response to" and "responsive to" describe one or more factors that trigger an effect. This phrase does not foreclose the possibility that additional factors may affect or otherwise trigger the effect, either jointly with the specified factors or independent from the specified factors. That is, an effect may be solely in response to those factors, or may be in response to the specified factors as well as other, unspecified factors. Consider the phrase "perform A in response to B." This phrase specifies that B is a factor that triggers the performance of A, or that triggers a particular result for A. This phrase does not foreclose that performing A may also be in response to some other factor, such as C. This phrase also does not foreclose that performing A may be jointly in response to B and C. This phrase is also intended to cover an embodiment in which A is performed solely in response to B. As used herein, the phrase "responsive to" is synonymous with the phrase "responsive at least in part to." Similarly, the phrase "in response to" is synonymous with the phrase "at least in part in response to."

Within this disclosure, different entities (which may variously be referred to as "units," "circuits," other components, etc.) may be described or claimed as "configured" to perform one or more tasks or operations. This formulation [entity] configured to [perform one or more tasks] is used herein to refer to structure (i.e., something physical). More specifically, this formulation is used to indicate that this structure is arranged to perform the one or more tasks during operation. A structure can be said to be "configured to" perform some tasks even if the structure is not currently being operated. Thus, an entity described or recited as being "configured to" perform some tasks refers to something physical, such as a device, circuit, a system having a processor unit and a memory storing program instructions executable to implement the task, etc. This phrase is not used herein to refer to something intangible.

In some cases, various units/circuits/components may be described herein as performing a set of tasks or operations. It is understood that those entities are "configured to" perform those tasks/operations, even if not specifically noted.

The term "configured to" is not intended to mean "configurable to." An unprogrammed FPGA, for example, would not be considered to be "configured to" perform a particular function. This unprogrammed FPGA may be "configurable to" perform that function, however. After appropriate programming, the FPGA may then be said to be "configured to" perform the particular function.

For purposes of United States patent applications based on this disclosure, reciting in a claim that a structure is "configured to" perform one or more tasks is expressly intended not to invoke 35 U.S.C. § 112(f) for that claim element. Should Applicant wish to invoke Section 112(*f*) during prosecution of a United States patent application based on this disclosure, it will recite claim elements using the "means for" [performing a function] construct.

Different "circuits" may be described in this disclosure. These circuits or "circuitry" constitute hardware that includes various types of circuit elements, such as combinatorial logic, clocked storage devices (e.g., flip-flops, registers, latches, etc.), finite state machines, memory (e.g., random-access memory, embedded dynamic random-access memory), programmable logic arrays, and so on. Circuitry may be custom designed, or taken from standard libraries. In various implementations, circuitry can, as appropriate, include digital components, analog components, or a combination of both. Certain types of circuits may be commonly referred to as "units" (e.g., a decode unit, an arithmetic logic unit (ALU), functional unit, memory management unit (MMU), etc.). Such units also refer to circuits or circuitry.

The disclosed circuits/units/components and other elements illustrated in the drawings and described herein thus include hardware elements such as those described in the preceding paragraph. In many instances, the internal arrangement of hardware elements within a particular circuit may be specified by describing the function of that circuit. For example, a particular "decode unit" may be described as performing the function of "processing an opcode of an instruction and routing that instruction to one or more of a plurality of functional units," which means that the decode unit is "configured to" perform this function. This specification of function is sufficient, to those skilled in the computer arts, to connote a set of possible structures for the circuit.

In various embodiments, as discussed in the preceding paragraph, circuits, units, and other elements may be defined by the functions or operations that they are configured to implement. The arrangement and such circuits/units/components with respect to each other and the manner in which they interact form a microarchitectural definition of the hardware that is ultimately manufactured in an integrated circuit or programmed into an FPGA to form a physical implementation of the microarchitectural definition. Thus, the microarchitectural definition is recognized by those of skill in the art as structure from which many physical implementations may be derived, all of which fall into the broader structure described by the microarchitectural definition. That is, a skilled artisan presented with the microarchitectural definition supplied in accordance with this disclosure may, without undue experimentation and with the application of ordinary skill, implement the structure by coding the description of the circuits/units/components in a hardware description language (HDL) such as Verilog or VHDL. The HDL description is often expressed in a fashion that may appear to be functional. But to those of skill in the art in this field, this HDL description is the manner that is used to transform the structure of a circuit, unit, or component to the next level of implementational detail. Such an HDL description may take the form of behavioral code (which is typically not synthesizable), register transfer language (RTL) code (which, in contrast to behavioral code, is typically synthesizable), or structural code (e.g., a netlist specifying logic gates and their connectivity). The HDL description may subsequently be synthesized against a library of cells designed for a given integrated circuit fabrication technology, and may be modified for timing, power, and other reasons to result in a final design database that is transmitted to a foundry to generate masks and ultimately produce the integrated circuit. Some hardware circuits or portions thereof may also be custom-designed in a schematic editor and captured into the integrated circuit design along with synthesized circuitry. The integrated circuits may include transistors and other circuit elements (e.g. passive elements such as capacitors, resistors, inductors, etc.) and interconnect between the transistors and circuit elements. Some embodiments may implement multiple integrated circuits coupled together to implement the hardware circuits, and/or discrete elements may be used in some embodiments. Alternatively, the HDL design may be synthesized to a programmable logic array such as a field programmable gate array (FPGA) and may be implemented in the FPGA. This decoupling between the design of a group of circuits and the subsequent low-level implementation of these circuits commonly results in the scenario in which the circuit or logic designer never specifies a particular set of structures for the low-level implementation beyond a description of what the circuit is configured to do, as this process is performed at a different stage of the circuit implementation process.

The fact that many different low-level combinations of circuit elements may be used to implement the same specification of a circuit results in a large number of equivalent structures for that circuit. As noted, these low-level circuit implementations may vary according to changes in the fabrication technology, the foundry selected to manufacture the integrated circuit, the library of cells provided for a particular project, etc. In many cases, the choices made by different design tools or methodologies to produce these different implementations may be arbitrary.

Moreover, it is common for a single implementation of a particular functional specification of a circuit to include, for a given embodiment, a large number of devices (e.g., millions of transistors). Accordingly, the sheer volume of this information makes it impractical to provide a full recitation of the low-level structure used to implement a single embodiment, let alone the vast array of equivalent possible implementations. For this reason, the present disclosure describes structure of circuits using the functional shorthand commonly employed in the industry.

Numerous variations and modifications will become apparent to those skilled in the art once the above disclosure is fully appreciated. It is intended that the following claims be interpreted to embrace all such variations and modifications.

What is claimed is:

1. An apparatus, comprising:
   a hierarchical power delivery circuit that includes:
      a first level of power converter circuitry that is configured to generate, from an input voltage, a plurality of first-level regulated supply voltages; and
      a second level of power converter circuitry that is configured to generate, from corresponding ones of the plurality of first-level regulated supply voltages, a plurality of second-level regulated supply voltages to a computing element comprising one or more integrated circuits configured to operate as a single, logical computer system, wherein the computing element is configured to operate in a plurality of power configurations having differing numbers of load circuits; and
      wherein the hierarchical power delivery circuit is configured to selectively enable differing portions of the first and second levels of power converter circuitry for corresponding ones of the plurality of power configurations of the computing element.

2. The apparatus of claim 1, wherein the plurality of first-level regulated supply voltages includes a first regulated supply voltage and a second regulated supply voltage generated by a first power converter and a second power converter, respectively.

3. The apparatus of claim 2, wherein the plurality of second-level regulated supply voltages includes a third regulated supply voltage and a fourth regulated supply voltage, wherein ones of a first plurality of power converters implemented on a first integrated circuit are configured to generate the third regulated supply voltage, and wherein ones of a second plurality of power converters implemented on a second integrated circuit are configured to generate the fourth regulated supply voltage.

4. The apparatus of claim 1, wherein the second level of power converter circuitry includes a plurality of power converters, wherein a number of enabled ones of the plurality of power converters is dependent on a particular one of the plurality of power configurations of the computing element.

5. The apparatus of claim 1, wherein the second level of power converter circuitry includes a plurality of power converters, wherein a number of enabled ones of the plurality of power converters is dependent on a number of integrated circuits comprising the computing element.

6. The apparatus of claim 1, wherein the first level of power converter circuitry includes at least one multi-phase power converter, wherein a number of enabled phases of the at least one multi-phase power converter is dependent on a number of load circuits supplied to the one or more integrated circuits of the computing element by the second level of power converter circuitry.

7. The apparatus of claim 1, wherein the second level of power converter circuitry includes a power converter having control circuitry configured to control power-up and power down sequences for at least one power converter of the first level of power converter circuitry and one or more power converters of the second level of power converter circuitry.

8. The apparatus of claim 1, wherein the second level of power converter circuitry includes one or more coupled-inductor buck converters.

9. The apparatus of claim 1, further comprising at least one control bus coupled between respective power converters of the first and second levels of power converter circuitry.

10. The apparatus of claim 1, wherein the first level of power converter circuitry includes at least one power converter configured to remain operating when the input voltage is present, and wherein the first and second levels of power converter circuitry further include respective power converters configured to enter a sleep mode.

11. A system comprising:
a computing element comprised of one or more integrated circuits configured to operate as a single, logical computer system, wherein the computing element is configured to operate in a plurality of power configurations having differing numbers of load circuits; and
a power delivery system configured to provide power to the computing element, wherein the power delivery system comprises:
a first power converter level comprising first and second power converters configured to generate, from a common input voltage, first and second regulated supply voltages; and
a second power converter level comprising a first plurality of power converters and a second plurality of power converters, wherein ones of the first plurality of power converters are configured to generate, from the first regulated supply voltage, a third regulated supply voltage, and wherein ones of the second plurality of power converters are configured to generate, from the second regulated supply voltage, a fourth regulated supply voltage;
wherein the power delivery system is configured to selectively enable differing portions of the first and second power converter levels for corresponding ones of the plurality of power configurations of the computing element.

12. The system of claim 11, wherein the computing element comprises a computing architecture that is scalable from a first one of the plurality of power configurations comprising a single integrated circuit die to one or more additional ones of the plurality of power configurations comprising two or more integrated circuit dies, wherein the two or more integrated circuit dies are configured as a single system in which existence of multiple integrated circuit dies is transparent to software executing on the single system.

13. The system of claim 11, wherein the plurality of power configurations includes at least one configuration wherein a portion of a single integrated circuit is disabled.

14. The system of claim 11, wherein the first and second power converters are multi-phase power converters, wherein a number of phases enabled for ones of the first and second power converters is dependent on a selected one of the plurality of power configurations.

15. The system of claim 11, wherein a number of enabled ones of the first plurality of power converters and a number of enabled ones of the second plurality of power converters is dependent on a selected one of the plurality of power configurations.

16. The system of claim 11, wherein the first plurality of power converters comprises a plurality of coupled-inductor buck converters.

17. The system of claim 11, wherein the second power converter level includes a power converter having control circuitry configured to control, via a control bus, a power-up sequence for at least one power converter of the first power converter level and one or more power converters of the second power converter level.

18. A non-transitory computer readable medium storing instructions that, when executed on a computer system, are usable to manufacture an electronic circuit, the electronic circuit comprising:
a hierarchical power delivery circuit that includes:
a first level of power converter circuitry that is configured to generate, from an input voltage, a first supply voltage and a second supply voltage;
a second level of power converter circuitry that is configured to generate, from corresponding ones of the first and second supply voltages, one or more instances of a third supply voltage and one or more instances of a fourth supply voltage to be provided to a computing element comprising one or more integrated circuits configured to operate as a single, logical computer system, wherein the computing element is configured to operate in a plurality of power configurations having differing numbers of load circuits; and
wherein the hierarchical power delivery circuit is configured to selectively enable differing portions of the first and second levels of power converter circuitry for corresponding ones of the plurality of power configurations of the computing element.

19. The computer readable medium of claim 18, wherein the hierarchical power delivery circuit includes:
a first multi-phase power converter configured to generate the first supply voltage;
a second multi-phase power converter configured to generate the second supply voltage;
a first plurality of power converters configured to generate, using the first supply voltage, the third supply voltage; and
a second plurality of power converters configured to generate, using the second supply voltage, the fourth supply voltage.

20. The computer readable medium of claim 19, wherein respective numbers of operational phases of the first and second multi-phase power converters and respective numbers of operational ones of the first and second pluralities of power converters are dependent on a selected one of the plurality of power configurations.

* * * * *